3,084,126
PROCESS OF EXTRUDING A FOAMABLE STYRENE POLYMER CONTAINING AN ALKALI METAL SILICATE
Frank A. Carlson, Jr., and Norbert Platzer, Springfield, Mass., assignors to Monsanto Chemical Company, St. Louis, Mo., a corporation of Delaware
No Drawing. Filed Aug. 6, 1956, Ser. No. 602,451
6 Claims. (Cl. 260—2.5)

The present invention relates to a process for extruding foamable styrene polymer compositions and to the particulate foamable styrene polymer compositions to be employed therein.

Styrene polymer foams constitute a valuable class of materials which are finding increasingly wide application in the fabrication of numerous industrial and consumer articles. A widely used method for fabricating such styrene polymer foams comprises extruding particulate foamable styrene polymer compositions through screw-type extruders. When styrene polymer foams are prepared by such extrusion processes it is difficult to obtain foams in which the cell sizes are uniform and which cells have an average diameter of less than about 0.05 inch. Styrene polymer foams containing cells of this size are brittle and the fragile nature of the extruded products limits their acceptance in the art. While certain additives may be incorporated in the particulate foamable styrene polymer compositions to reduce the cell size of the extruded foams, such additives are relatively inefficient and/or seriously reduce the rate at which such compositions can be extruded.

It is an object of this invention to provide an improved process for extruding particulate foamable styrene polymer compositions.

Another object of this invention is to provide an improved process for extruding particulate foamable styrene polymer compositions in which the cell sizes in the extruded foams are substantially uniform and less than about 0.02 inch in diameter.

A further object of this invention is to provide particulate foamable styrene polymer compositions which, when extruded, provide foamed articles in which the cell sizes are substantially uniform and less than about 0.02 inch in diameter.

Other objects and advantages of the invention will become apparent from the following detailed description thereof.

It has been discovered that when a small quantity of finely divided alkali metal silicate is incorporated in a particulate foamable styrene polymer composition, the resulting composition can be extruded by conventional techniques to prepare resilient styrene polymer foams in which the cell sizes are substantially uniform and less than about 0.02 inch in diameter. The alkali metal silicate containing particulate foamable styrene polymer compositions can be extruded at very satisfactory rates and do not require modification of presently employed extrusion processes.

The following examples are set forth to illustrate more clearly the principle and practice of this invention to those skilled in the art. All parts are by weight.

EXAMPLE I

Part A

One part of a finely divided potassium metasilicate having an average particle size of about 1 micron is dry-blended with 99 parts of a finely divided styrene homopolymer having an average molecular weight of 60,000. The resulting polymer-potassium metasilicate mixture is extruded into fine ribbons which are pelletized and ground to an average particle size of about 0.1 inch in diameter. The resulting granules are steeped in a large excess of pentane for 24 hours at 25° C. with constant agitation being provided to prevent agglomeration of the polymer particles. The resulting foamable styrene polymer particles are recovered by filtration and dried in shallow open tray evaporators to remove excess pentane. The product contains approximately 8 weight percent pentane.

Part B

The particulate foamable styrene polymer particles prepared in Part A above are extruded into a foam sheet through a conventional screw-type extruder at an extrusion temperature of about 325° F. and a die pressure of about 150 p.s.i. The resulting foam has a density of about 4 lbs. per cubic foot. The cells of the foam are substantially uniform and have an average diameter of about 0.02 inch. The foamed sheet is strong and resilient and can be scored and folded through an angle of 180° without fracture.

In contrast to these results, a corresponding particulate foamable styrene polymer composition which does not contain the potassium metasilicate, when extruded under identical conditions, gives a foam having grossly irregular cell sizes, nearly all of which exceed 0.05 inch in diameter. The resulting foam is brittle and fractures when scored and folded through an angle of 180°.

EXAMPLE II

One part of the potassium metasilicate described in Example I, Part A, is dry-blended with 99 parts of a finely divided foamable styrene homopolymer of approximately 60,000 molecular weight and which has 5 weight percent pentane incorporated therein. The physical admixture of the foamable styrene polymer particles and the potassium metasilicate is extruded under the conditions described in Example I, Part B, and comparable results are obtained.

EXAMPLE III

Three parts of a 40° Bé. sodium silicate solution (waterglass) is diluted with 10 parts of water and externally blended with 99 parts of the foamable styrene homopolymer described in Example II. The mixture is air-dried in trays at 30° C. and then extruded under the conditions of Example I, Part B. The extruded foam is uniform and very flexible and has an average cell size of about 0.01 inch.

The extrudable particulate foamable styrene polymer compositions provided by the invention comprise (1) a styrene polymer, (2) a foaming agent which is an organic compound having a boiling point below the softening point of the styrene polymer employed and (3) a finely divided alkali metal silicate. Such compositions may be substantially homogeneous in which event the alkali metal silicate is incorporated in and distributed throughout the styrene polymer. Alternatively, the compositions may be heterogeneous physical admixtures of (a) the particulate styrene polymer having the foaming agent substantially homogeneously incorporated therein and (b) the finely divided alkali metal silicate.

The alkali metal silicates included in the compositions of the invention are finely divided and have average particulate sizes of less than about 5 microns or preferably less than about 2 microns and even more especially less than about 1 micron. The finely divided alkali metal silicates, depending upon their particular crystal structure and method of manufacture, may have water physically and/or chemically combined therewith. Since such absorbed water has no deleterious effect upon the compositions of this invention, there is no need to dry the alkali metal silicates. The alkali metal silicate is employed in small amounts, usually in the range of 0.1–5.0 weight percent and preferably 0.2–2.0 weight percent of the total composition.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene include the conjugated 1,3-dienes, e.g., butadiene, isoprene, etc., alpha,beta unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of the styrene polymer with other polymers may be employed, e.g., blends of the styrene polymer with rubbery diene polymers, or the analogous compositions obtained by dissolving a rubbery diene polymer in the styrene monomer and subsequently polymerizing the mixture. In any of the above type resins, all or a portion of the styrene may be replaced with its closely related homologues such as alpha-methylstyrene, o-, m-, and p-methylstyrenes, o-, m-, and p-ethylstyrenes, 2,4-dimethylstyrene, etc. In general, the styrene polymers employed should have a molecular weight in the range of about 40,000–80,000 (as determined by the Staudinger method).

The foaming agents included in the composition of the invention are aliphatic hydrocarbons boiling within the range of about 10–80° C., and which can be incorporated substantially homogeneously therethrough. Preferably, although not mandatorily, the foaming agent should have little or no solvent action on the styrene polymer. Suitable examples of such foaming agents include pentane, hexane, cyclopentane, cyclopentadiene, etc. If desired, mixtures of 2 or more foaming agents may be employed.

The extrusion process provided by the present invention is conventional except for the composition employed therein. For example, the extrusion operation may be carried out in continuous screw extruders at temperatures ranging from about 250° F. to about 400° F., depending upon the softening temperature of the styrene polymer employed. The most uniform material is obtained at temperatures of 300–325° F. The material may be extruded through dies of any desired configuration into open or closed molds or into the open air. The pressure of the die should be greater than about 150 p.s.i. to prevent foaming within the die. The extrusion rates obtainable under any given set of extrusion conditions are fully equivalent to those obtained with corresponding foamable styrene polymer compositions which do not contain an alkali metal silicate.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing a resilient styrene polymer foam having substantially uniform cell sizes, the average diameter of which is less than about 0.02", which comprises extruding a mixture of 95.0–99.9 weight percent of a foamable styrene polymer composition and, correspondingly, 5.0–0.1 weight percent of an alkali metal silicate at a temperature of 250–400° F. and a pressure of greater than 150 p.s.i., said foamable styrene polymer composition having incorporated therein, as a foaming agent, a liquid aliphatic hydrocarbon containing at least 5 carbon atoms in its structure and having a boiling point not higher than about 80° C., said alkali metal silicate having an average particle size of less than about 5 microns.

2. The process of claim 1 wherein the alkali metal silicate has an average particle size of less than about 2 microns.

3. The process of claim 1 wherein the alkali metal silicate has an average particle size of less than about 1 micron.

4. The process of claim 1 wherein the alkali metal silicate constitutes 0.2–2.0 weight percent and the particulate styrene polymer containing said foaming agent constitutes 99.8–98.0 weight percent.

5. The process of claim 1 wherein the alkali metal silicate is sodium silicate.

6. The process of claim 1 wherein the alkali metal silicate is potassium silicate.

References Cited in the file of this patent

UNITED STATES PATENTS

| | | |
|---|---|---|
| 2,450,436 | McIntire | Oct. 5, 1948 |
| 2,577,743 | De Long | Dec. 11, 1951 |
| 2,653,987 | Baty | Sept. 29, 1953 |
| 2,760,941 | Iler | Aug. 28, 1956 |
| 2,848,428 | Rubens | Aug. 19, 1958 |